(12) United States Patent
Sievert et al.

(10) Patent No.: US 6,642,481 B2
(45) Date of Patent: Nov. 4, 2003

(54) INTEGRATED WELDING CONTROL AND POWER SUPPLY USING PHASED CONTROL POWER TECHNOLOGY

(75) Inventors: Dale Sievert, Appleton, WI (US); Anthony J. Kowaleski, Manawa, WI (US); Jeffery R. Ihde, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 3 days.

(21) Appl. No.: 09/853,458

(22) Filed: May 11, 2001

(65) Prior Publication Data

US 2002/0166849 A1 Nov. 14, 2002

(51) Int. Cl.$^7$ ................................................. B23K 9/10
(52) U.S. Cl. ................................. 219/130.1; 219/130.5; 901/42
(58) Field of Search .................... 219/130.5, 125.1, 219/130.1, 130.21, 130.31, 130.32, 130.33; 901/42

(56) References Cited

U.S. PATENT DOCUMENTS

| 4,561,059 A | * | 12/1985 | Davis et al. | ............ 219/130.21 |
| 5,233,158 A | * | 8/1993 | Karakama et al. | ..... 219/130.33 |
| 6,107,601 A | * | 8/2000 | Shimogama | ............... 219/130.5 |
| 6,278,082 B1 | * | 8/2001 | Shimogama | ............... 219/130.5 |

OTHER PUBLICATIONS

Auto Invision Part 1 of 2 Miller The Power of Blue May 1999.
Auto Invision Part 2 of 2 Miller The Power of Blue May 1999.
Deltaweld Series Miller The Power of Blue Jul. 2000.
Robotic Interface II Miller The Power of Blue Sep. 1998.

* cited by examiner

*Primary Examiner*—Clifford C. Shaw
(74) *Attorney, Agent, or Firm*—George R. Corrigan

(57) ABSTRACT

A method and apparatus for welding with a robotic welder is disclosed. The system includes a power supply, preferably phase controlled, a controller and a robotic interface. The components are in a single housing. the controller is externally controlled. An adaptor cord connects a robot controller to the power supply. The controller also has an automatic set-up control connected to the power control output.

30 Claims, 2 Drawing Sheets

INTEGRATED WELDING CONTROL AND POWER SUPPLY USING PHASED CONTROL POWER TECHNOLOGY

FIELD OF THE INVENTION

The present invention relates generally to the art of welding. More specifically, it relates to phase controlled power supplies used with robotic welders.

BACKGROUND OF THE INVENTION

There are many type of known welding systems used for many processes. Welding system, as used herein, includes one or more of a power supply, wire feeder, controller, and source of gas, it may also include peripherals such as robots etc.

One welding application is a MIG process used with a robotic welder, such as that performed by a Miller DeltaWeld™. This invention will be described particularly with reference to phase controlled robotic MIG welding systems. Robotic MIG welding is performed with a power supply, welding controller, wire feeder and robot (having controller and mechanical portions).

The robot includes its own controller. The welding process is controlled by first setting up the welding system (setting robot type and output parameters). After setting up the system the welding process may be controlled by the robot controller. For example, the user inputs information to the robot controller, and the robot controller provides control information to the welding controller.

The welding controller must be able to communicate with the robot controller for proper control of the welding process. However, each robot manufacturer has it own control output for interfacing with the welding system and its own control commands. Thus, a unique connector is needed for each robot. Also, a "translator" that translates the robot controller commands to commands used by the welding controller must be provided.

The prior art provides an interface box designed for a particular robot, such as one of several (one per robot) Miller Robotic Interface II™. The user would choose the interface box depending upon which robot type they use. Also, a cord that mates with the robot connector at one end, and the interface box at the other end, was needed. The interface box also had a cord to connect to the welding system. The interface translates the robot controller commands to commands used by the welding power supply, so that the robot can control the process.

Other prior art robotic welding systems use inverter-based power supplies, such as the Miller Auto Invision. Inverter-based power supplies have more sophisticated controllers than phase control power supplies. Accordingly, such prior art systems have used the advanced controllers to includes a robotic interface that worked with a single robot type inside the power supply housing. Unfortunately, due to the nature of phase control power supplies, only external robot interfaces have been provided.

Accordingly, a robotic welding system that is phase controlled and provides for a robot interface internal to the power supply is desired. Preferably it will be capable of connecting to different kinds of robots.

SUMMARY OF THE PRESENT INVENTION

In accordance with a first aspect of the invention a welding system used with a robotic welder includes a phase controlled power supply, a robot receptacle, and a controller. The controller is operatively connected to the power supply, and includes a robot interface connected the robot receptacle. The robot receptacle, robot interface, controller and power supply are all disposed in a single housing.

According to a second aspect of the invention a method of welding with a robotic welder includes providing phase controlled power, receiving a first end of a cord having a second end capable of being connected to a robot, controlling the power, and interfacing with the robot using an interface and a controller disposed in a single housing.

According to a third aspect of the invention a welding system used with a robotic welder includes a power supply, a robot receptacle and an externally controlled controller. The controller is operatively connected to the power supply, and includes a robot interface connected the robot receptacle. The robot receptacle, robot interface, controller and power supply are all disposed in a single housing.

According to a fourth aspect of the invention a method of welding with a robotic welder includes providing power, receiving a first end of a cord having a second end capable of being connected to a robot, externally controlling the power and interfacing with the robot using an interface and a controller disposed in a single housing.

The controller provides a firing angle for at least one SCR in one embodiment.

An adaptor cord is connected to the robot receptacle and the robot receptacle can receive adaptor cords for a plurality of robot types in other embodiments.

The robot interface is comprised of a software implemented by a digital circuit in yet another alternative.

The controller is an externally controlled controller in another alternative.

Other principal features and advantages of the invention will become apparent to those skilled in the art upon review of the following drawings, the detailed description and the appended claims.

Figure 1:
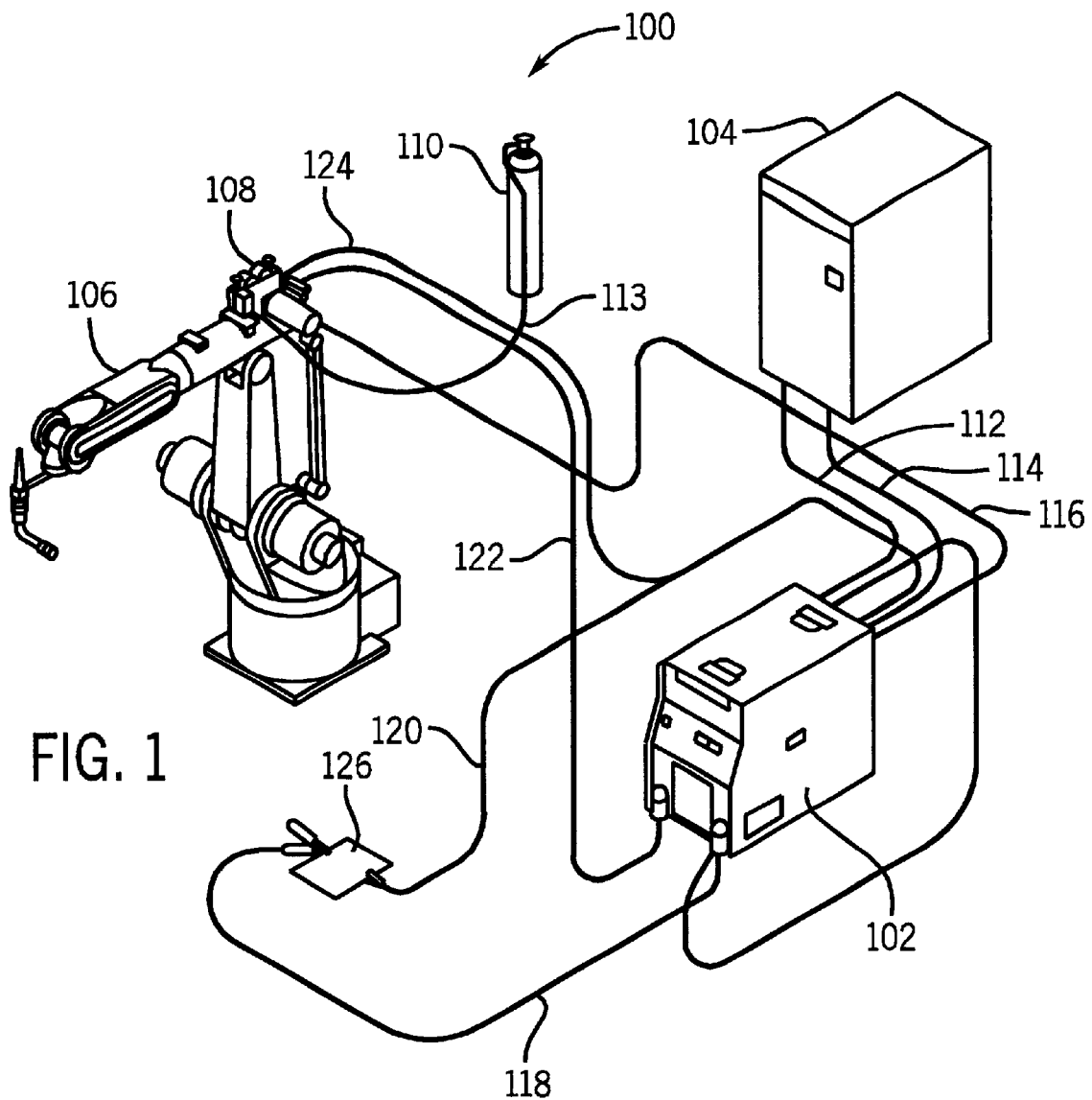
FIG. 1 is a diagram of a robotic welder in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular welding system using particular components in a particular environment it should be understood at the outset that the invention may also be implemented with other welding systems, power supplies, controllers, robots and components, and in other environments.

Generally, the invention relates to providing a phase controlled welding system having an internal robot interface. Robot interface, or interfacing with a robot, as used herein, includes an interface that understands and receives information from and sends information to a robot (including the robot controller). The interface is part of the controller for the phase controlled power supply. The interface is preferably such that it may be connected to the robot controller through an adaptor cord, and preferably accepts inputs from a plurality of robot types.

Adaptor cord, as used herein, includes a cord having a mated connection on one end for the power supply and a mated connection on the other end for a robot.

The welding power supply and controller used to implement the invention in the preferred embodiment is a phase controlled power supply, such as a Miller DeltaWeld™. Of course, other power supplies may be used.

A robotic welder 100 includes a welding power supply/controller 102, having a phase controlled power supply and a controller disposed therein, a robot controller 104, a robot 106, a wire feeder 108, and a source of gas 110, interconnected by a number of wires and connectors 112–124, which cooperate to produce a welding arc on the workpiece 126.

Gas is provided through a hose 113 from gas source 110 to robot 106. Power is provided on cable 122 to robot 106 (and wire feeder 108) from power supply 102. Power is also provided from the negative output stud on power supply 102 on cable 118 to workpiece 126. Voltage sense leads 120 and 124 provide voltage feedback information to welding power supply/controller 102. Control signals are provided between robot controller 104 and welding controller 102 on lines 112 and 114. Control signals are also provided from power supply 102 to robot 106 on line 116. The arrangement thus far is generally similar to the prior art.

Figure 2:
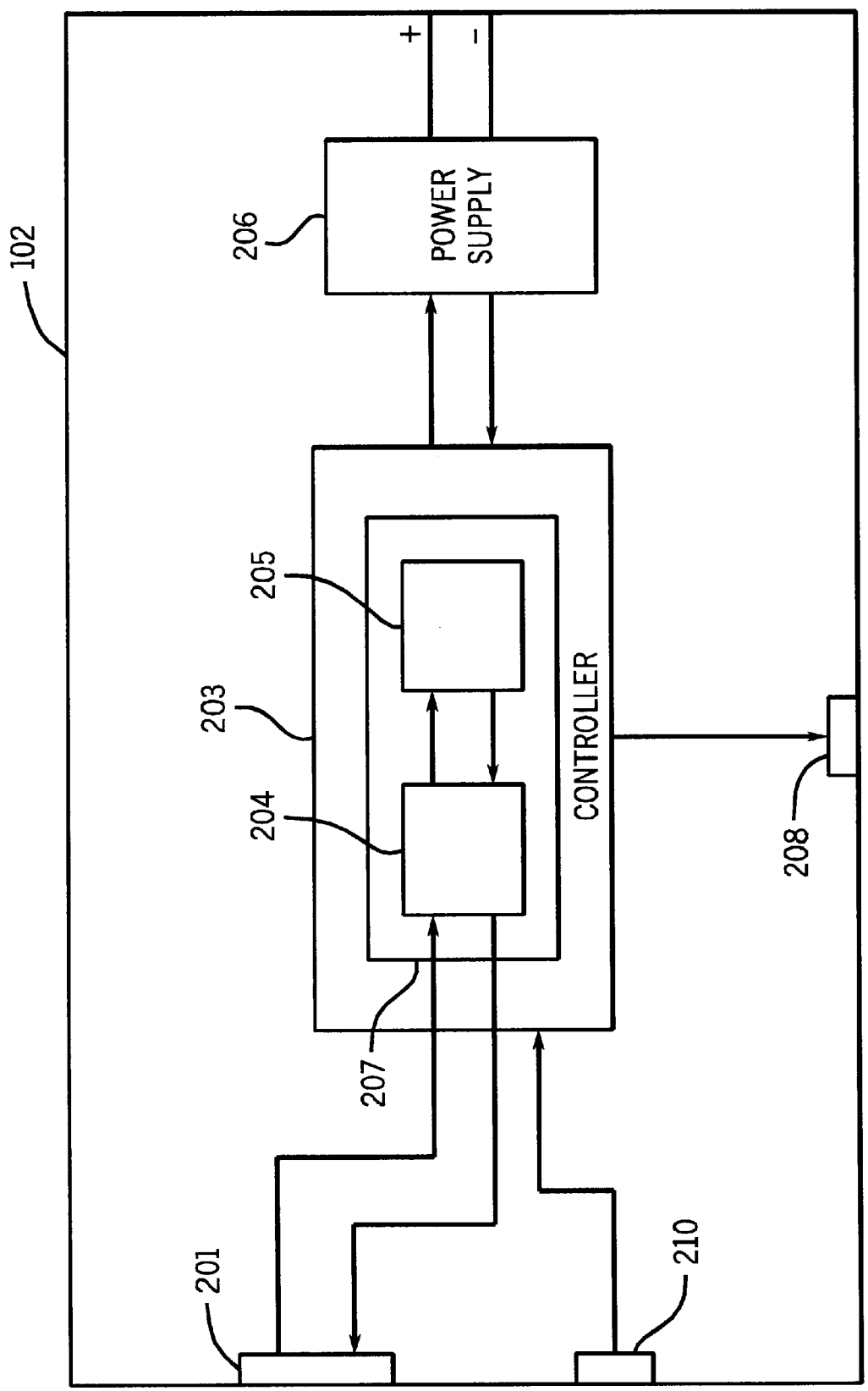
FIG. 2 is a schematic of a controller and power supply in accordance with the present invention.

Referring now to FIG. 2 a diagram of one embodiment of power supply/controller 102 is shown to include a controller 203, including a microprocessor 207, a phase controlled power circuit or power supply 206, a robot receptacle 201 (i.e., a connector that receives a cord capable of connecting to a robot), feedback input(s) 210, and a control output 208 (such as for a wire feeder), interconnected by various lines or cables (each of the lines or cables may include more than one connector power or signal carrying connector).

Power supply 206 is preferably a phase-controlled power supply such as a Miller DeltaWeld™ power supply. Phase controlled power supply, as used herein, includes a power circuit that has at least one phase controlled device, such as an SCR.

Controller 203 is operatively connected to power supply 206. Controller, as used herein, includes digital and analog, circuitry, discrete or integrated circuitry, microprocessors, DSPs, etc., and software, hardware and firmware, located on one or more boards, used to control a device such as a power supply. Operatively connected, as used herein, includes a connection wherein the controller controls the power supply output.

Feedback information is provided from power supply 206 to controller 203. Feedback information from outside power supply/controller 102 is provided feedback input 210 to controller 203. Alternative embodiments provide for greater or fewer number of feedback inputs. Information is provided from the external robot and robot controller via robot receptacle 201 to controller 203.

Information is provided from controller 203 to robot receptacle 201, and then to robot controller 104. Various embodiments provide for information to be provided only from controller 203 to robot controller 104, provided only from robot controller 104 to controller 203, or provided in both a directions.

Controller 203 and microprocessor 207 include, among other features, a software implemented portion of robot interface 204. It receives information from interface 201, and "translates" the information received so that it can be used by controller 203 to control phase controlled power supply 206.

Specifically, controller 203 includes software 205 that determines the firing angle (i.e., where in the cycle the SCR is fired) for SCRs in power supply 206 that will result in the needed output power from power supply 206. The set point information provided from the robot controller, through interface 201, and translated by interface 204, is used by software 205 (which could also be hardware) to control the firing angle.

Welding system 100 is implemented, in the preferred embodiment, using with a "smart" or "mid-range" robot controllers that provide any needed set point and control parameters. This information is translated by interface 204 so that all user information is provided by robot controller 104. Thus, there is no need to input settings or control values into power supply/controller 102—it is completely externally controlled. Externally controlled, as used herein, refers to a power supply/controller that receives all control parameters from another source, such as a controller, and it does not have user selectable inputs thereon.

For example, robot controller 104 sends controller 207 voltage set point, wire feed speed set point, and start and stop welding information. Controller 207 can understand this information because interface 204 is able to interpret it.

The preferred embodiment provides for the automatic configuration or setup of some variables within the power supply after automatic detection of the robot type. This is done through the use of an input jumper configuration inside the adapter cord that allows connection to different welding robots on the market. Each adapter has a unique combination of jumpers that specifies to what robot the power supply is connected. When the robot is connected, the controller automatically sets variables such as what to display, remote program select, stick check on or off, robot jog command, volt sense shutdown, auxiliary relay mode, and general arc sequencing. Specifically, for an ABB™ rotating the robot controls all weld sequencing, auxiliary relay is off, display commands, volt sense shutdown is off, remote program select is on, and robot jog command is off. For a FANUC™ robot, the robot controls all weld sequencing, auxiliary relay is off, display commands, volt sense shutdown is on, remote program select is on, and robot jog command is on.

Preferably, interface 204 can interpret commands from multiple robot types. This allows the single power supply/controller to be used with different robots, without changing components, if an adaptor cord for each robot type is provided. The adaptor cord can include pin assignments that identify the robot type, to aide in the translation. Alternatively, the communication between controller 203 and robot controller 104 can be made using a standard serial communication link, or other communication protocol. This allows each component to identify itself, and the software of interface 204 can make the appropriate translations of any commands received.

An adaptor cord used with the present invention preferably includes an end that mates with robot receptacle 201, and the other end mates with a robot connection. Because controller 203 includes the robot interface, all that is needed to connect controller/power supply 102 to robot controller 104 is the adaptor cord. Additionally, because controller 203 is externally controlled, welding system 100 is essentially a plug and play system. The information the user would need to enter to control the weld process is automatically provided.

Numerous modifications may be made to the present invention which still fall within the intended scope hereof. Thus, it should be apparent that there has been provided in accordance with the present invention a method and apparatus for welding with a robotic system that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding system for use with a robotic welder comprising:
   a phase controlled power supply;
   a robot receptacle; and
   a controller, operatively connected to the power supply, and including a robot interface connected the robot receptacle;
   wherein the robot receptacle, robot interface, controller and power supply are disposed in a single housing.

2. The system of claim 1, wherein the phase controlled power supply includes at least one SCR, and the controller provides a firing angle of the at least one SCR.

3. The system of claim 1, further comprising an adaptor cord connected to the robot receptacle.

4. The system of claim 1 wherein the robot interface is comprised of a software implemented by a digital circuit.

5. The system of claim 4, wherein the controller is an externally controlled controller.

6. The system of claim 1, wherein the robot receptacle can receive adaptor cords for a plurality of robot types.

7. The system of claim 1, wherein the receptacle means can receive cords means used with a plurality of robot types.

8. A welding system for use with a robotic welder comprising:
   power means for provided phase controlled power;
   receptacle means for receiving a cord connected to a robot;
   control means for controlling the power means, operatively connected to the power means; and
   interface means for interfacing with and understanding a robot controller, connected to the receptacle means;
   wherein the receptacle means, interface means, controller means and power means are disposed in a single housing.

9. The system of claim 8, wherein the power means includes at least one SCR, and the control means includes means for firing angle the at least one SCR.

10. The system of claim 9 further comprising a cord means for connecting the receptacle means to a robot controller.

11. The system of claim 10 wherein the interface means includes means for executing a software program.

12. The system of claim 11, wherein the control means is an externally controlled controller.

13. A method of welding with a robotic welder comprising:
   providing phase controlled power;
   receiving a first end of a cord having a second end capable of being connected to a robot;
   controlling the power;
   interfacing with the robot using an interface and a controller disposed in a single housing.

14. The method of claim 13, wherein controlling the power includes choosing a firing angle for at least one SCR.

15. The method of claim 13 further comprising a for connecting a second end of the cord to a robot.

16. The method of claim 14 wherein interfacing includes executing a software program.

17. The method of claim 16, further comprising an externally controlling the controller.

18. The method of claim 16, further comprising selecting the cord from a plurality of cords used with a plurality of robot types.

19. A welding system for use with a robotic welder comprising:
   a power supply;
   a robot receptacle; and
   an externally controlled controller, operatively connected to the power supply, and including a robot interface connected the robot receptacle;
   wherein the robot receptacle, robot interface, controller and power supply are disposed in a single housing.

20. The system of claim 19, further comprising an adaptor cord connected to the robot rececctacle.

21. The system of claim 20 wherein the robot interface is comprised of a software implemented by a digital circuit.

22. The system of claim 20, wherein the robot receptacle can receive adaptor cords for a plurality of robot types.

23. A welding system for use with a robotic welder comprising:
   power means for welding power;
   receptacle means for receiving a cord connected to a robot;
   control means for receiving external control and for controlling the power means, operatively connected to the power means; and
   interface means for interfacing with and understanding a robot controller, connected to the receptacle means;
   wherein the receptacle means, interface means, controller means and power means are disposed in a single housing.

24. The system of claim 23 further comprising a cord means for connecting the receptacle means to a robot controller.

25. The system of claim 24 wherein the interface means includes means for executing a software program.

26. The system of claim 23, wherein the receptacle means can receive cords means used with a plurality of robot types.

27. A method of welding with a robotic welder comprising:
   providing power;
   receiving a first end of a cord having a second end capable of being connected to a robot;
   externally controlling the power;
   interfacing with the robot using an interface and a controller disposed in a single housing.

28. The method of claim 27 further comprising a for connecting a second end of the cord to a robot.

29. The method of claim 27 wherein interfacing includes executing a software program.

30. The method of claim 27, further comprising selecting the cord from a plurality of cords used with a plurality of robot types.

* * * * *